United States Patent
You et al.

(10) Patent No.: US 12,206,452 B2
(45) Date of Patent: Jan. 21, 2025

(54) MULTI-SOURCE WIRELESS OPTICAL COMMUNICATION SPECTRUM SENSING SYSTEM AND METHOD

(71) Applicant: SOOCHOW UNIVERSITY, Suzhou (CN)

(72) Inventors: Xiaodi You, Suzhou (CN); Zile Jiang, Suzhou (CN); Gangxiang Shen, Suzhou (CN)

(73) Assignee: SOOCHOW UNIVERSITY, Suzhou (CN)

(*) Notice: Subject to any disclaimer, the term of this patent is extended or adjusted under 35 U.S.C. 154(b) by 0 days.

(21) Appl. No.: 17/924,716

(22) PCT Filed: Dec. 27, 2021

(86) PCT No.: PCT/CN2021/141490
§ 371 (c)(1),
(2) Date: Nov. 11, 2022

(87) PCT Pub. No.: WO2023/097837
PCT Pub. Date: Jun. 8, 2023

(65) Prior Publication Data
US 2024/0305373 A1    Sep. 12, 2024

(30) Foreign Application Priority Data
Dec. 2, 2021   (CN) .......................... 202111463521.7

(51) Int. Cl.
*H04B 10/116*   (2013.01)
*H04B 10/50*    (2013.01)

(52) U.S. Cl.
CPC ......... *H04B 10/116* (2013.01); *H04B 10/502* (2013.01)

(58) Field of Classification Search
CPC ............... H04B 10/116; H04B 10/502; H04B 10/1141; H04B 10/1143; H04B 10/1149;
(Continued)

(56) References Cited

U.S. PATENT DOCUMENTS

| | | | |
|---|---|---|---|
| 2011/0200338 A1* | 8/2011 | Yokoi | H04B 10/116 398/158 |
| 2017/0201321 A1* | 7/2017 | Uysal | H04B 10/116 |

(Continued)

FOREIGN PATENT DOCUMENTS

| | | |
|---|---|---|
| CN | 106792728 A | 5/2017 |
| CN | 109379153 A | 2/2019 |

(Continued)

OTHER PUBLICATIONS

Description CN113098604A_Machine Translation (Year: 2021).*
(Continued)

*Primary Examiner* — Hibret A Woldekidan
(74) *Attorney, Agent, or Firm* — SZDC Law PC

(57) ABSTRACT

The invention relates to a multi-source wireless optical communication spectrum sensing system, including: a transmit end, configured to transmit an optical signal, the transmit end including multiple LEDs; and a secondary user terminal, configured to: receive the optical signal transmitted by the transmit end, convert the optical signal into an electrical signal, filter out a direct current component in the electrical signal to obtain a filtered electrical signal, sample the electrical signal to obtain sampling data and a corresponding sampling quantity, perform channel estimation based on the sampling quantity and acquired location data of the secondary user terminal to obtain a channel matrix, calculate a detection metric M and a decision threshold K based on the channel matrix, the sampling data, and the sampling quan-
(Continued)

tity, and determine, based on a value relationship between M and K, whether a channel is occupied by a primary user.

9 Claims, 3 Drawing Sheets

(58) Field of Classification Search
CPC .... H04B 10/114; H04B 10/118; H04B 10/50; H04B 10/60; H04B 10/40; H04B 7/0695; H04B 7/088; H04J 2203/0062; H04J 3/1652; H04J 14/08; H04J 14/02
See application file for complete search history.

(56) References Cited

U.S. PATENT DOCUMENTS

| | | | |
|---|---|---|---|
| 2017/0331670 A1* | 11/2017 | Parkvall | H04L 41/0816 |
| 2018/0123897 A1* | 5/2018 | Lee | H04W 64/003 |
| 2019/0028192 A1* | 1/2019 | Tsonev | H04W 56/0005 |
| 2023/0189020 A1* | 6/2023 | Calcev | H04W 74/0816 370/329 |
| 2023/0353240 A1* | 11/2023 | Calvente | H04B 10/116 |

FOREIGN PATENT DOCUMENTS

| | | | | |
|---|---|---|---|---|
| CN | 113098604 A | * | 7/2021 | ........... H04B 10/116 |
| WO | 2020037629 A1 | | 2/2020 | |

OTHER PUBLICATIONS

Xiao-long Zhao et al., "Phototropism Based Multi-threshold Weighted Cooperative Spectrum Sensing Algorithm" Journal of Military Communications Technology, vol. 34, No. 3, pp. 12-15, 77, Sep. 30, 2013.

Sudhanshu Arya et al., "Spectrum Sensing for Optical Wireless Scattering Communications Over Málaga Fading—A Cooperative Approach with Hard Decision Fusion" IEEE Transactions on Communications, Jul. 31, 2021.

* cited by examiner

MULTI-SOURCE WIRELESS OPTICAL COMMUNICATION SPECTRUM SENSING SYSTEM AND METHOD

This application is the National Stage Application of PCT/CN2021/141490, filed on Dec. 27, 2021, which claims priority to Chinese Patent Application No. 202111463521.7, filed on Dec. 2, 2021, which is incorporated by reference for all purposes as if fully set forth herein.

FIELD OF THE INVENTION

The present invention relates to the field of target detection technologies, and in particular, to a multi-source wireless optical communication spectrum sensing system and method.

DESCRIPTION OF THE RELATED ART

In recent years, indoor wireless optical communication technology using a light-emitting diode (LED) as a signal emitting source has been developing rapidly. Compared with conventional wireless radio frequency communication, wireless optical communication has advantages such as a high transmission rate, good security, and no harm to environment and health. In a wireless optical communication system, multiple users usually exist. To better provide services for multiple users and ensure the quality of service, scholars have proposed the concept of cognitive wireless optical communication, the basic principle of which is to categorize wireless optical communication users into licensed users (primary users) and unlicensed users (secondary users). A primary user has higher communication authority and preferentially occupies communication spectrum resources for data transmission, enjoying the guarantee of high speed, low latency, and quality of service. A secondary user is allowed to occupy a communication spectrum for data transmission only when the primary user is idle and cannot enjoy the guarantee of high speed, low latency, and quality of service. To fully improve the utilization of spectrum resources and to avoid interference with the communication of the primary user, the secondary user needs to learn the status of the primary user (that is, whether the primary user is transmitting data) at any time based on a received signal and establish or disconnect a wireless optical communication link based on the status. Such a technology of detecting the status of a primary user based on a received signal is referred to as spectrum sensing, and is a key technology in cognitive wireless optical communication.

In a wireless optical communication system, to meet the lighting and communication requirements of indoor places, multiple LED light sources are usually used as transmitters. These LED light sources simultaneously send information to a primary user terminal. Certainly, these optical signals will also be received by a secondary user. Due to different optical path differences between different LED light sources and a receiver of a secondary user terminal as well as the reflection from walls, ceilings, and obstacles, these optical signals from multiple LED light sources will reach a receiver of a secondary user after different delays, causing a multi-path effect to affect the performance of spectrum sensing.

There are also some strategies for spectrum sensing in conventional radio frequency communication networks. For example, in an orthogonal frequency-division multiplexing (OFDM)-based radio frequency communication system, a common method is using the autocorrelation property of cyclic prefixes for detection. In the basic principle of the method, each symbol of an OFDM signal carries a cyclic prefix. That is, a copy of part of content at the end of one symbol is inserted at the beginning of the symbol. Such a structure provides the signal with a strong periodic smoothness characteristic, so that a signal of a primary user can be detected.

However, a current wireless optical communication system is often accompanied by a multi-path effect. As a result, signals of a primary user that are received by a secondary user become self-correlated and are no longer independent of each other, which degrades the performance of an energy detection-based method. In addition, although a cyclic prefix-based detection method has high performance, it is highly complex to implement the method. The sampling of the secondary user needs to be kept synchronized with a cyclic prefix of a signal of the primary user, and the performance of spectrum sensing of the method is not stable under the impact of the multi-path effect. In addition, the algorithm has a high requirement in a priori information, and the secondary user needs to know the length of a symbol of a signal of the primary user and the length of the cyclic prefix.

Therefore, there is an urgent need for a scheme that can overcome the impact of a multi-path effect on the performance of spectrum sensing under multiple light sources, thereby improving the accuracy of spectrum sensing.

SUMMARY OF THE INVENTION

For this, a technical problem to be resolved by the present invention is to overcome the problem in the prior art, and provide a multi-source wireless optical communication spectrum sensing system and method, which significantly improve the detection precision, to further improve the accuracy and applicability of target detection.

To resolve the foregoing technical problem, the present invention provides a multi-source wireless optical communication spectrum sensing system, including:

a transmit end, configured to transmit an optical signal, the transmit end including multiple LEDs; and a secondary user terminal, configured to: receive the optical signal transmitted by the transmit end, convert the optical signal into an electrical signal, filter out a direct current component in the electrical signal to obtain a filtered electrical signal, sample the electrical signal to obtain sampling data and a corresponding sampling quantity, perform channel estimation based on the sampling quantity and acquired location data of the secondary user terminal to obtain a channel matrix, respectively calculate a detection metric and a decision threshold based on the channel matrix, the sampling data, and the sampling quantity, and determine whether a channel is occupied by a primary user, where the determining whether a channel is occupied by a primary user includes:

comparing the detection metric and the decision threshold, and if the detection metric is greater than the decision threshold, determining that the channel is occupied by the primary user, or otherwise, determining that the channel is not occupied by the primary user.

In an embodiment of the present invention, the secondary user terminal includes:

a photoelectric detector module, configured to convert the optical signal into the electrical signal;

a direct current filter module, configured to filter out the direct current component in the electrical signal to obtain the filtered electrical signal;

a sampling module, configured to sample the filtered electrical signal to obtain the sampling data and the corresponding sampling quantity;

a location information acquisition module, configured to acquire the location data of the secondary user terminal; and a channel matrix estimation module, configured to perform channel estimation based on the sampling quantity and the location data to obtain the channel matrix.

In an embodiment of the present invention, the secondary user terminal includes:

a detection metric calculation module, configured to calculate the detection metric;

a decision threshold calculation module, configured to calculate the decision threshold; and a determination module, configured to: compare the detection metric and the decision threshold, and if the detection metric is greater than the decision threshold, determine that the channel is occupied by the primary user, or otherwise, determine that the channel is not occupied by the primary user.

In addition, the present invention further provides a multi-source wireless optical communication spectrum sensing method, including:

transmitting, by a transmit end, an optical signal;

receiving, by a secondary user terminal, the optical signal transmitted by the transmit end, converting the optical signal into an electrical signal, filtering out a direct current component in the electrical signal to obtain a filtered electrical signal, and sampling the electrical signal to obtain sampling data and a corresponding sampling quantity;

performing channel estimation based on the sampling quantity and acquired location data of the secondary user terminal to obtain a channel matrix; and calculating a detection metric based on the channel matrix and the sampling data, calculating a decision threshold according to the channel matrix and the sampling quantity, comparing the detection metric and the decision threshold, and if the detection metric is greater than the decision threshold, determining that a channel is occupied by a primary user, or otherwise, determining that a channel is not occupied by a primary user.

In an embodiment of the present invention, a method of performing channel estimation based on the sampling quantity and acquired location data of the secondary user terminal includes:

performing channel estimation after a sampling quantity N is obtained, and generating the channel matrix $$\hat{H} = \begin{bmatrix} \hat{h}_1 & \ldots & \hat{h}_m & 0 & \ldots & \ldots & 0 \\ 0 & \hat{h}_1 & \ldots & \hat{h}_m & 0 & \ldots & 0 \\ & & & \vdots & & & \\ 0 & \ldots & \ldots & 0 & \hat{h}_1 & \ldots & \hat{h}_m \end{bmatrix}_{N \times (N+m-1)},$$

where m is a length of a discrete channel, $$\hat{h}_j = \begin{cases} \sum_{i \in I_j} H_{i,LOS}(0), & I_j \neq \emptyset \\ 0, & I_j = \emptyset \end{cases}, j = 1, \ldots, m,$$

$$H_{i,LOS}(0) = \begin{cases} \frac{(l+1)A_r \cos^l(\phi_i) T_s(\theta_i) g(\theta_i) \cos(\theta_i)}{2\pi D_i^2}, & 0 \leq \theta_i \leq \psi_c \\ 0, & \theta_i > \psi_c \end{cases}, i = 1, \ldots, L,$$

l is a Lambert radiation order of an LED, $A_r$ is an active area of a photoelectric detector module, $T_s$ is a gain of a direct current filter module, g is a gain of an optical concentrator, $\psi_c$ is an angle of view of a receiver of the secondary user terminal, c is the speed of light, $t_0$ is a sampling interval, in addition, $I_j = \{i=1, \ldots, L | j = [D_i/ct_0]\}$, [•] is a rounding function, $D_i$ is a distance from an $i^{th}$ LED to the receiver of the secondary user terminal, $\phi_i$ and $\theta_i$ respectively represent an emergence angle and an incident angle, $D_i$, $\phi_i$, and $\theta_i$ are represented as $$\begin{cases} D_i = \sqrt{(x_i - x_r)^2 + (y_i - y_r)^2 + (z_i - z_r)^2} \\ \phi_i = \arccos((z_i - z_r)/D_i) \\ \theta_i = \arccos(<v_i, v_O>/(\|v_i\| \cdot \|v_O\|)) \end{cases},$$

$v_i = [x_i - x_r, y_i - y_r, z_i - z_r]$, $v_O = [\sin \beta \cdot \cos \alpha, \sin \beta \cdot \sin \alpha, \cos \beta]$, $<\bullet, \bullet>$ represents an inner product of two vectors, and $\alpha$ and $\beta$ are respectively an azimuthal angle and a polar angle of the photoelectric detector module.

In an embodiment of the present invention, the coordinates $(x_i, y_i, z_i)$ and $(x_r, y_r, z_r)$ are respectively location coordinates of the $i^{th}$ LED and location coordinates of the receiver of the secondary user terminal, and are acquired by a location information acquisition module.

In an embodiment of the present invention, after a sampling data x, a sampling quantity N, and a channel matrix $\hat{H}$ are obtained, a method of calculating the detection metric and the decision threshold includes:

a calculation formula of the detection metric is $M_{likelihood} = x^T[\sigma_n^{-2}I - (\sigma_n^2 I + \sigma_s^2 \gamma^2 \hat{H} \hat{H}^T)^{-1}]x$, and a calculation formula of the decision threshold is $$K_{likelihood} = \sigma_n^2 \cdot \frac{tr(T^2)}{tr(T)} \cdot F_{\chi^2}^{-1}\left(1 - \mu; \frac{[tr(T)]^2}{tr(T^2)}\right),$$

where $T = \sigma^{n-2l} - (\sigma n 2^l + \sigma_s^2 \gamma^2 \hat{H} \hat{H} T)^{-1}$, Tr( ) represents the trace of the matrix, $F_{\chi^2}(x;d)$ is a distribution function of a chi-square distribution with a degree of freedom of d, μ is a false alarm probability preset by a secondary user, and the false alarm probability is a probability that it is incorrectly determined that a primary user exists when a primary user does not exist.

In an embodiment of the present invention, after a sampling data x, a sampling quantity N, and a channel matrix $\hat{H}$ are obtained, a method of calculating the detection metric and the decision threshold includes:

a calculation formula of the detection metric is $M_{half} = x^T \hat{H} \hat{H}^T x$, and a calculation formula of the decision threshold is $$K_{half} = N^{-1} \sigma_n^2 \frac{\|\hat{H}\hat{H}^T\|_{Fro}^2}{\|\hat{h}\|^2} \cdot F_{\chi^2}^{-1}\left(1 - \mu; \frac{N^2 \|\hat{h}\|^4}{\|\hat{H}\hat{H}^T\|_{Fro}^2}\right),$$

where $\|\bullet\|_{Fro}$ is the Frobenius norm of the matrix, and $\hat{h} = [\hat{h}1, \ldots, \hat{h}m]$.

In an embodiment of the present invention, after a sampling data x, a sampling quantity N, and a channel matrix $\hat{H}$ are obtained, a method of calculating the detection metric and the decision threshold includes:

a calculation formula of the detection metric is $$M_{near} = \frac{\left(x^T \hat{H}\hat{H}^T x\right)}{\left(x^T x\right)},$$

and the decision threshold $K_{near}$ is obtained by solving an equation $$\mu = 1 - F_F\left(\sum_{i=1}^{N}\omega_i^+ / \sum_{i=1}^{N}\omega_i^-; \left(\sum_{i=1}^{N}\omega_i^+\right)^2 / \sum_{i=1}^{N}(\omega_i^+)^2, \left(\sum_{i=1}^{N}\omega_i^-\right)^2 / \sum_{i=1}^{N}(\omega_i^-)^2\right),$$

where $F_F$ (x; $d_1$, $d_2$) is a distribution function of an F distribution with parameters being $d_1$ and $d_2$, $\omega_i$ (i=1, . . . , N) is an eigenvalue of a matrix $\hat{H}\hat{H}^T - K_{near}I$, and symbols '+' and '−' are respectively defined as $a^+$=max {a, 0} and $a^-$=max{−a, 0}.

In an embodiment of the present invention, after a sampling data x, a sampling quantity N, and a channel matrix $\hat{H}$ are obtained, a method of calculating the detection metric and the decision threshold includes:

a calculation formula of the detection metric is $M_{joint} = x^T \hat{H} Q Q^T \hat{H}^T x$, and a calculation formula of the decision threshold is $$K_{joint} = \sigma_n^2 \frac{\|\hat{H}QQ^T\hat{H}^T\|_{Fro}^2}{\|\hat{H}Q\|_{Fro}^2} \cdot F_{\chi^2}^{-1}\left(1 - \mu; \frac{\|\hat{H}Q\|_{Fro}^2}{\|\hat{H}QQ^T\hat{H}^T\|_{Fro}^2}\right), \text{ where } Q =$$

$$\begin{bmatrix} Q_0 & & & \\ & Q_0 & & \\ & & \ddots & \\ & & & Q_0 \end{bmatrix}, Q_0 = \begin{bmatrix} O_{L_C \times L_D} & I_{L_C \times L_C} \\ I_{L_D \times L_D} & O_{L_D \times L_C} \end{bmatrix},$$

sample x includes D OFDM symbols, and sampling quantities of cyclic prefixes and data in each OFDM symbol are respectively $L_c$ and $L_d$.

Compared with the prior art, the foregoing technical solution of the present invention has the following advantages:

1. By means of the present invention, a single secondary user in an indoor wireless optical communication system may detect the current status of a primary user through a received signal, especially in a multi-path channel, so that the impact of a multi-path effect on the performance of spectrum sensing can be effectively overcome, thereby improving the utilization efficiency of spectrums.
2. The detection scheme provided in the present invention can significantly improve the detection accuracy compared with conventional energy detection, and can significantly reduce the complexity and achieve a very close detection effect compared with conventional cyclic prefix-based detection.
3. The present invention has high robustness, and still has a good detection effect in consideration of a positioning error and tilting of a receiver.

BRIEF DESCRIPTION OF THE DRAWINGS

To make the content of the present invention clearer and more comprehensible, the present invention is further described in detail below according to specific embodiments of the present invention and the accompanying drawings.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
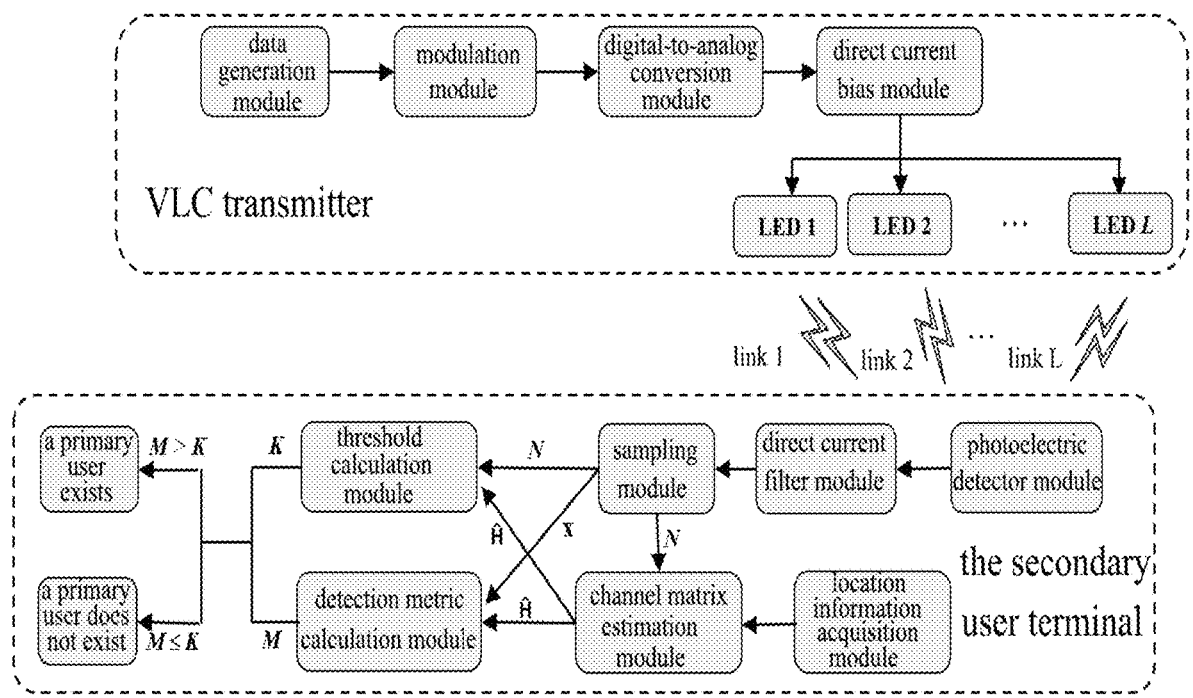
FIG. 1 is a schematic diagram of a hardware structure of a multi-source wireless optical communication spectrum sensing system according to the present invention.

Referring to FIG. 1, this embodiment of the present invention provides a multi-source wireless optical communication spectrum sensing system, including:

a transmit end, configured to transmit an optical signal, the transmit end including multiple LEDs; and
a secondary user terminal, configured to: receive the optical signal transmitted by the transmit end, convert the optical signal into an electrical signal, filter out a direct current component in the electrical signal to obtain a filtered electrical signal, sample the electrical signal to obtain sampling data and a corresponding sampling quantity, perform channel estimation based on the sampling quantity and acquired location data of the secondary user terminal to obtain a channel matrix, calculate a detection metric based on the channel matrix and the sampling data, and calculate a decision threshold based on the channel matrix and the sampling quantity;
compare the detection metric and the decision threshold, and if the detection metric is greater than the decision threshold, determine that a channel is occupied by a primary user, or otherwise, determine that a channel is not occupied by a primary user.

The transmit end includes a data generation module, a modulation module, a digital-to-analog conversion module, and a direct current bias module. A bit stream of the primary user is generated by the data generation module, and sequentially passes through the modulation module, the digital-to-analog conversion module, and the direct current bias module to be converted into an output signal s(t) of an LED, and a square error of the output signal is denoted as $\sigma_s^2$. The output signal s(t) is transmitted through a channel and is received by the secondary user terminal, and a total channel impulse response is denoted as h(t).

The secondary user terminal includes a photoelectric detector module, a direct current filter module, a sampling module, a location information acquisition module, and a channel matrix estimation module. The photoelectric detector module is configured to the optical signal into an electrical signal. The direct current filter module is configured to filter out a direct current component in the electrical signal to obtain a filtered electrical signal. The sampling module is configured to sample the sample the filtered electrical signal to obtain sampling data and a corresponding sampling quantity. The location information acquisition module is configured to acquire location data of the secondary user terminal. The channel matrix estimation module is configured to perform channel estimation based on the sampling quantity and the location data to obtain a channel matrix.

The secondary user terminal further includes a detection metric calculation module, a decision threshold calculation module, and a determination module. The detection metric calculation module is configured to calculate the detection metric. The decision threshold calculation module is configured to calculate the decision threshold. The determination module is configured to: compare the detection metric and the decision threshold, and if the detection metric is greater than the decision threshold, determine that the channel is occupied by the primary user, or otherwise, determine that the channel is not occupied by the primary user.

Figure 2:
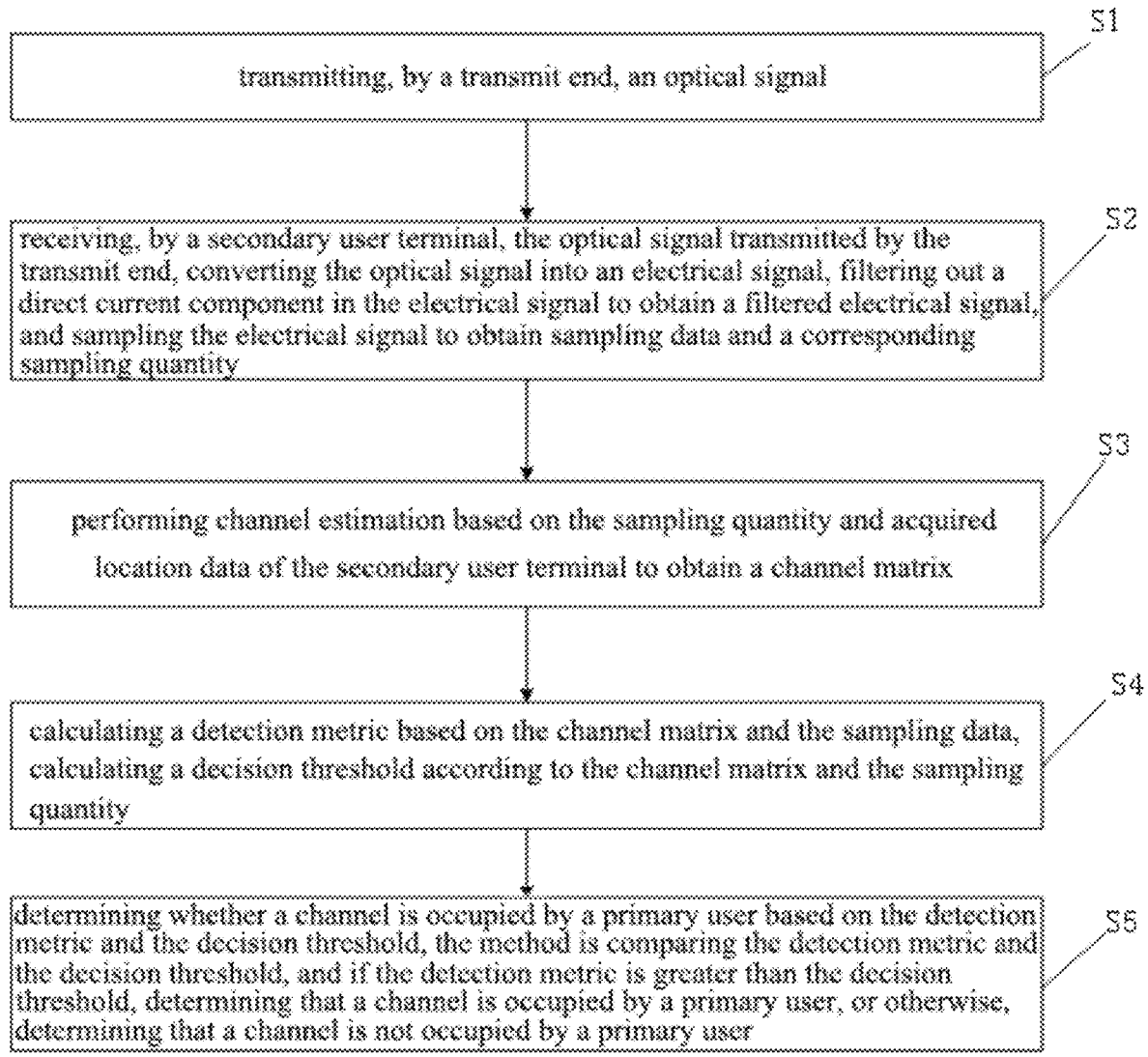
FIG. 2 is a schematic flowchart of a multi-source wireless optical communication spectrum sensing method according to the present invention.

In addition, referring to FIG. 2, the present invention further provides a multi-source wireless optical communication spectrum sensing method, including the following steps.

S1: A transmit end transmits an optical signal.

S2: A secondary user terminal receives the optical signal transmitted by the transmit end, converts the optical signal into an electrical signal, filters out a direct current component in the electrical signal to obtain a filtered electrical signal, and samples the electrical signal to obtain sampling data and a corresponding sampling quantity.

S3: Perform channel estimation based on the sampling quantity and acquired location data of the secondary user terminal to obtain a channel matrix.

S4: Calculate a detection metric based on the channel matrix and the sampling data; and calculate a decision threshold according to the channel matrix and the sampling quantity.

S5: Determine, based on the detection metric and the decision threshold, whether a channel is occupied by the primary user, a method of which is: comparing the detection metric and the decision threshold, and if the detection metric is greater than the decision threshold, determining that the channel is occupied by the primary user, or otherwise, determining that the channel is not occupied by the primary user.

In S2, the photoelectric detector module converts a received visible light signal into an electrical signal $x(t)$, which may be represented as $x(t)=\gamma s(t) \otimes h(t)+n(t)$, where $\gamma$ is the photoelectric conversion efficiency of a photodetector, and $n(t)$ is an additive Gaussian white noise with a square error of $\sigma_n^2$. After processing by the direct current filter module, a direct current component in the signal $x(t)$ is removed. Next, the sampling module performs discrete sampling on the signal with the direct current component removed, denoted as x, a length of which is N and is referred to as the sampling quantity. If the primary user transmits data, x includes a signal (which may be very weak) of the primary user and noise. Otherwise, x includes only noise. The objective of spectrum sensing is to accurately distinguish between the two cases.

In S3, channel estimation is performed after a sampling quantity N is obtained, and the channel matrix $$\hat{H} = \begin{bmatrix} \hat{h}_1 & \cdots & \hat{h}_m & 0 & \cdots & \cdots & 0 \\ 0 & \hat{h}_1 & \cdots & \hat{h}_m & 0 & \cdots & 0 \\ & & & \vdots & & & \\ 0 & \cdots & \cdots & 0 & \hat{h}_1 & \cdots & \hat{h}_m \end{bmatrix}_{N \times (N+m-1)}$$

is generated, where m is a length of a discrete channel, $$\hat{h}_j = \begin{cases} \sum_{i \in I_j} H_{i,LOS}(0), & I_j \neq \varnothing \\ 0, & I_j = \varnothing \end{cases}, j = 1, \ldots, m,$$

$$H_{i,LOS}(0) = \begin{cases} \frac{(l+1)A_r \cos^l(\phi_i) T_s(\theta_i) g(\theta_i) \cos(\theta_i)}{2\pi D_i^2}, & 0 \leq \theta_i \leq \psi_c \\ 0, & \theta_i > \psi_c \end{cases}, i = 1, \ldots, L,$$

l is a Lambert radiation order of an LED, $A_r$ is an active area of a photoelectric detector module, $T_s$ is a gain of a direct current filter module, g is a gain of an optical concentrator, $\psi_c$ is an angle of view of a receiver of the secondary user terminal, c is the speed of light, $t_0$ is a sampling interval, in addition, $I_j=\{i=1, \ldots, L|j=[D_i/ct_0]\}$, [•] is a rounding function, $D_i$ is a distance from an $i^{th}$ LED to the receiver of the secondary user terminal, $\phi_i$ and $\theta_i$ respectively represent an emergence angle and an incident angle, $D_i$, $\phi_i$, and $\theta_i$ are represented as $$\begin{cases} D_i = \sqrt{(x_i-x_r)^2+(y_i-y_r)^2+(z_i-z_r)^2} \\ \phi_i = \arccos((z_i-z_r)/D_i) \\ \theta_i = \arccos(<v_i, v_O>/(\|v_i\| \cdot \|v_O\|)) \end{cases},$$

$v_i=[x_i-x_r, y_i-y_r, z_i-z_r]$, $v_O=[\sin \beta \cdot \cos \alpha, \sin \beta \cdot \sin \alpha, \cos \beta]$, $<\bullet, \bullet>$ represents an inner product of two vectors, and $\alpha$ and $\beta$ are respectively an azimuthal angle and a polar angle of the photoelectric detector module.

The coordinates $(x_i, y_i, z_i)$ and $(x_r, y_r, z_r)$ are respectively location coordinates of the $i^{th}$ LED and location coordinates of the receiver of the secondary user terminal, and are acquired by a location information acquisition module. Certainly, when the location data of the LEDs is known by default, the location information acquisition module may acquire only location data of the receiver of the secondary user terminal.

After the sampling data x, the sampling quantity N, and the channel matrix H are obtained, the detection metric calculation module calculates the detection metric M. In addition, the decision threshold calculation module calculates the decision threshold K. Next, the detection metric M is compared with the decision threshold K. If the detection metric is greater than the decision threshold, it is determined that a primary user exists, or otherwise, it is determined that a primary user does not exist. Two concepts are defined: A detection probability refers to a probability that a primary user is accurately detected when the primary exists. A false alarm probability refers to a probability that it is incorrectly determined that a primary user exists when a primary user does not exist. The secondary user determines a threshold K according to a Neyman-Pearson criterion, that is, determines the value of K by fixing a theoretical false alarm probability μ (generally 0.05 or 0.1).

Based on different a priori information, a method of calculating the detection metric and the decision threshold includes the following schemes:

Scheme 1: Likelihood Ratio Detection Scheme

A priori information includes a signal square error of a primary user, a square error of noise, and location data of a secondary user terminal.

An expression of the detection metric M is:

$$M_{likelihood} = x^T \left[ \sigma_n^{-2} I - \left( \sigma_n^2 I + \sigma_s^2 \gamma^2 \hat{H} \hat{H}^T \right)^{-1} \right] x.$$

An expression of the decision threshold K is:

$$K_{likelihood} = \sigma_n^2 \cdot \frac{tr(T^2)}{tr(T)} \cdot F_{\chi^2}^{-1}\left(1 - \mu; \frac{[tr(T)]^2}{tr(T^2)}\right),$$

where $T = \theta_n^{-2} I - (\sigma_n^2 I + \sigma_s^2 \gamma^2 \hat{H} \hat{H}^T)^{-1}$, Tr( ) represents the trace of the matrix, $F_{\chi^2}(x;d)$ is a distribution function of a chi-square distribution with a degree of freedom of d, $\mu$ is a false alarm probability preset by a secondary user, and the false alarm probability is a probability that it is incorrectly determined that a primary user exists when a primary user does not exist.

Scheme 2: Semi-Blind Detection Scheme

A priori information includes a square error of noise and location data of a secondary user terminal.

An expression of the detection metric M is:

$$M_{half} = x^T \hat{H} \hat{H}^T x.$$

An expression of the decision threshold K is:

$$K_{half} = N^{-1} \sigma_n^2 \frac{\|\hat{H}\hat{H}^T\|_{Fro}^2}{\|\hat{h}\|^2} \cdot F_{\chi^2}^{-1}\left(1 - \mu; \frac{N^2 \|\hat{h}\|^4}{\|\hat{H}\hat{H}^T\|_{Fro}^2}\right),$$

where $\|\bullet\|_{Fro}$ is the Frobenius norm of the matrix, and $\hat{h} = [\hat{h}_1, \ldots, \hat{h}_m]$.

Scheme 3: Near-Blind Detection Scheme

A priori information includes location data of a secondary user terminal.

An expression of the detection metric M is:

$$M_{near} = \frac{\left(x^T \hat{H} \hat{H}^T x\right)}{\left(x^T x\right)}.$$

The decision threshold K does not have an explicit expression, but may be obtained by solving the following equation:

$$\mu = 1 - F_F\left(\sum_{i=1}^{N} \omega_i^+ / \sum_{i=1}^{N} \omega_i^-; \left(\sum_{i=1}^{N} \omega_i^+\right)^2 / \sum_{i=1}^{N} (\omega_i^+)^2, \left(\sum_{i=1}^{N} \omega_i^-\right)^2 / \sum_{i=1}^{N} (\omega_i^-)^2\right),$$

where $F_F(x; d_1, d_2)$ is a distribution function of an F distribution with parameters being $d_1$ and $d_2$, $\omega_i$ (i=1, ..., N) is an eigenvalue of a matrix $\hat{H}\hat{H}^T - K_{near} I$, and symbols '+' and '−' are respectively defined as $a^+ = \max\{a, 0\}$ and $a^- = \max\{-a, 0\}$. Because $\mu$ is an increasing function of K, (11) may be easily solved by using an iterative method.

Scheme 4: Joint Detection Scheme

A priori information includes a square error of noise, location data of a secondary user terminal, a length of a cyclic prefix of a signal of the primary user, and a data length.

A sample x includes D OFDM symbols, and sampling quantities of cyclic prefixes and data in each OFDM symbol are respectively $L_c$ and $L_d$. An expression of the detection metric M is:

$$M_{joint} = x^T \hat{H} Q Q^T \hat{H}^T x,$$

An expression of the decision threshold K is:

$$K_{joint} = \sigma_n^2 \frac{\|\hat{H}QQ^T\hat{H}^T\|_{Fro}^2}{\|\hat{H}Q\|_{Fro}^2} \cdot F_{\chi^2}^{-1}\left(1 - \mu; \frac{\|\hat{H}Q\|_{Fro}^4}{\|\hat{H}QQ^T\hat{H}^T\|_{Fro}^2}\right),$$

where $$Q = \begin{bmatrix} Q_0 & & \\ & Q_0 & \\ & & \ddots \\ & & & Q_0 \end{bmatrix}, \quad Q_0 = \begin{bmatrix} O_{L_C \times L_D} & I_{L_C \times L_C} \\ I_{L_D \times L_D} & O_{L_D \times L_C} \end{bmatrix}.$$

The foregoing Scheme 1 and Scheme 2 can significantly improve the detection accuracy compared with conventional energy detection, and can significantly reduce the complexity and achieve a very close detection effect compared with conventional cyclic prefix-based detection.

Compared with the conventional cyclic prefix-based detection, the foregoing Scheme 4 can further improve the detection accuracy.

The foregoing Scheme 3 has low accuracy compared with a conventional scheme but has the lowest requirement in a priori information and is not affected by an error in noise estimation.

Figure 3:
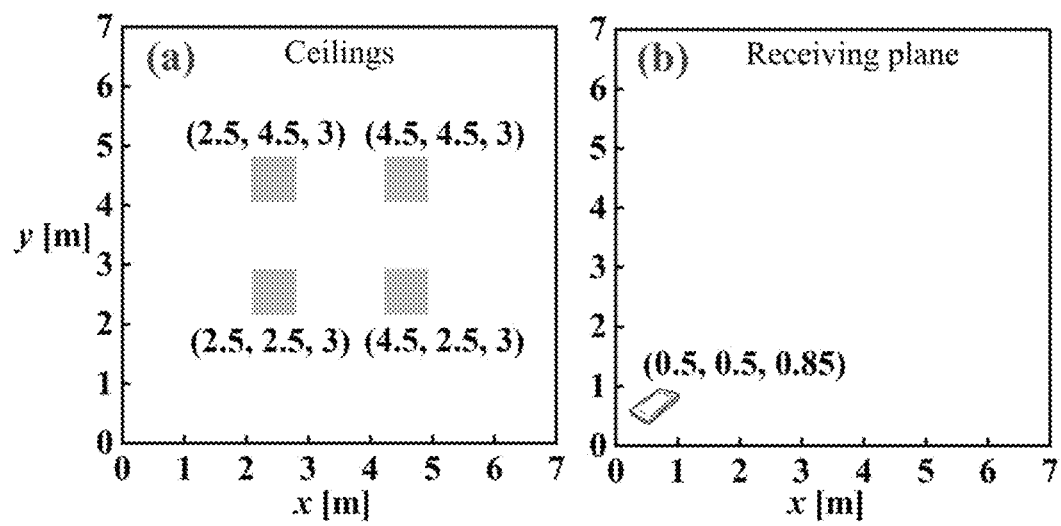
FIG. 3(a) shows a room model for an indoor VLC system according to the present invention.
FIG. 3(b) shows the position of a secondary user terminal.

To evaluate the performance of the multi-source wireless optical communication spectrum sensing system and method provided in the present invention, a specific indoor VLC system is considered in the present invention. The system is shown in FIG. 3. The size of the room is 7 m×7 m×3 m. Four LEDs are respectively located at (2.5, 2.5, 3), (2.5, 4.5, 3), (4.5, 2.5, 3), and (4.5, 4.5, 3), as shown in FIG. 3(a). The output power of each LED is 4 W. The height of a user receiving platform is 0.85 m. There is one secondary user in the room, and the position of the secondary user is shown in FIG. 3(b).

Figure 4:
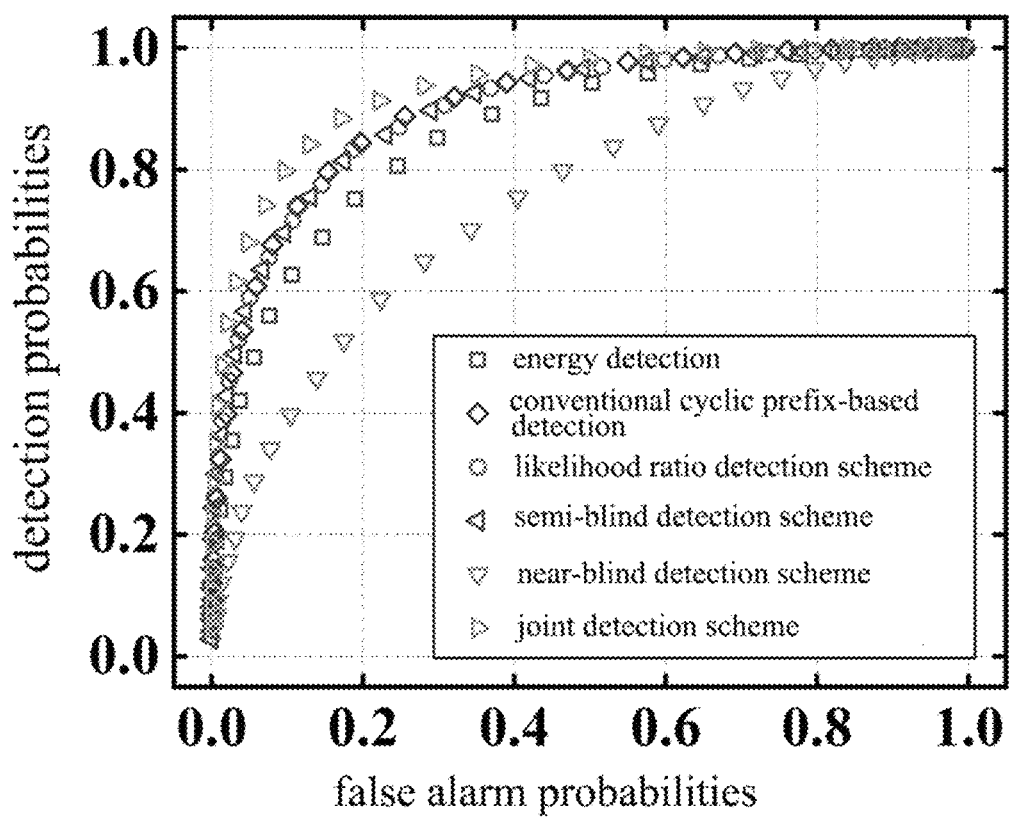
FIG. 4 is an ROC curve graph of four detection schemes in the present invention and a conventional detection scheme.

The four schemes provided in the present invention, the conventional energy detection scheme, and the cyclic prefix-based detection scheme are respectively tested and verified below. The sampling quantity of each secondary user terminal is 1600. Results are shown in the form an ROC curve, as shown in FIG. 4. When the false alarm probability is 0.1, the detection probabilities of Scheme 1, Scheme 2, Scheme 3, and Scheme 4 in the present invention, the conventional energy detection scheme, and the cyclic prefix-based detection scheme are respectively 0.71, 0.71, 0.40, 0.80, 0.61, and 0.72. That is, compared with the conventional energy detection scheme, Scheme 1 and Scheme 2 in the present invention can improve the detection accuracy by about 10%, and Scheme 4 can improve the detection accuracy by about 20%. Compared with the conventional cyclic prefix-based detection scheme, Scheme 1 and Scheme 2 in the present invention can reach close accuracy in a case that the requirements in complexity and a priori information are greatly lowered. Scheme 3 provided in the present invention has low accuracy compared with other schemes, but requires least a priori information and is the easiest to implement.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A multi-source wireless optical communication spectrum sensing system, comprising:
   a transmit end, configured to transmit an optical signal, the transmit end comprising multiple LEDs; and
   a secondary user terminal, configured to: receive the optical signal transmitted by the transmit end, convert the optical signal into an electrical signal, filter out a direct current component in the electrical signal to obtain a filtered electrical signal, sample the electrical signal to obtain sampling data and a corresponding sampling quantity, perform channel estimation based on the sampling quantity and acquired location data of the secondary user terminal to obtain a channel matrix, respectively calculate a detection metric and a decision threshold based on the channel matrix, the sampling data, and the sampling quantity, and determine whether a channel is occupied by a primary user, wherein the determining whether a channel is occupied by a primary user comprises:
   comparing the detection metric and the decision threshold, and if the detection metric is greater than the decision threshold, determining that the channel is occupied by the primary user, or otherwise, determining that the channel is not occupied by the primary user,
   wherein performing channel estimation based on the sampling quantity and acquired location data of the secondary user terminal comprises:
   performing channel estimation after a sampling quantity N is obtained, and generating the channel matrix $$\hat{H} = \begin{bmatrix} \hat{h}_1 & \cdots & \hat{h}_m & 0 & \cdots & \cdots & 0 \\ 0 & \hat{h}_1 & \cdots & \hat{h}_m & 0 & \cdots & 0 \\ & & & \vdots & & & \\ 0 & \cdots & \cdots & 0 & \hat{h}_1 & \cdots & \hat{h}_m \end{bmatrix}_{N \times (N+m-1)},$$

wherein m is a length of a discrete channel, $$\hat{h}_j = \begin{cases} \sum_{i \in I_j} H_{i,LOS}(0), & I_j \neq \varnothing \\ 0, & I_j = \varnothing \end{cases}, j = 1, \ldots, m,$$

$$H_{i,LOS}(0) = \begin{cases} \frac{(l+1)A_r \cos^l(\phi_i) T_s(\theta_i) g(\theta_i) \cos(\theta_i)}{2\pi D_i^2}, & 0 \leq \theta_i \leq \psi_c \\ 0, & \theta_i > \psi_c \end{cases}, i = 1, \ldots, L,$$

is a Lambert radiation order of an LED, $A_r$ is an active area of a photoelectric detector module, $T_s$ is a gain of a direct current filter module, g is a gain of an optical concentrator, $\psi_c$ is an angle of view of a receiver of the secondary user terminal, c is the speed of light, $t_0$ is a sampling interval, $I_j = \{i=1, \ldots, L | j = [D_i/ct_0]\}$, [•] is a rounding function, $D_i$ is a distance from an $i^{th}$ LED to the receiver of the secondary user terminal, $\phi_i$ and $\theta_i$ respectively represent an emergence angle and an incident angle, $D_i$, $\phi_i$, and $\theta_i$ are represented as $$\begin{cases} D_i = \sqrt{(x_i - x_r)^2 + (y_i - y_r)^2 + (z_i - z_r)^2} \\ \phi_i = \arccos((z_i - z_r)/D_i) \\ \theta_i = \arccos(<v_i, v_O>/(\|v_i\| \cdot \|v_O\|)) \end{cases},$$

wherein $v_i = [x_i - x^r, y_i - y_r, z_i - z_r]$, $v_O = [\sin \beta \cdot \cos \alpha, \sin \beta \cdot \sin \alpha, \cos \beta]$, $<\bullet, \bullet>$ represents an inner product of two vectors, and $\alpha$ and $\beta$ are respectively an azimuthal angle and a polar angle of the photoelectric detector module.

2. The multi-source wireless optical communication spectrum sensing system according to claim 1, wherein the secondary user terminal comprises:
   a photoelectric detector module, configured to convert the optical signal into the electrical signal;
   a direct current filter module, configured to filter out the direct current component in the electrical signal to obtain the filtered electrical signal;
   a sampling module, configured to sample the filtered electrical signal to obtain the sampling data and the corresponding sampling quantity;

a location information acquisition module, configured to acquire the location data of the secondary user terminal; and a channel matrix estimation module, configured to perform channel estimation based on the sampling quantity and the location data to obtain the channel matrix.

3. The multi-source wireless optical communication spectrum sensing system according to claim 1, wherein the secondary user terminal comprises:

a detection metric calculation module, configured to calculate the detection metric;

a decision threshold calculation module, configured to calculate the decision threshold; and a determination module, configured to: compare the detection metric and the decision threshold, and if the detection metric is greater than the decision threshold, determine that the channel is occupied by the primary user, or otherwise, determine that the channel is not occupied by the primary user.

4. A multi-source wireless optical communication spectrum sensing method, comprising:

transmitting, by a transmit end, an optical signal;

receiving, by a secondary user terminal, the optical signal transmitted by the transmit end, converting the optical signal into an electrical signal, filtering out a direct current component in the electrical signal to obtain a filtered electrical signal, and sampling the electrical signal to obtain sampling data and a corresponding sampling quantity;

performing channel estimation based on the sampling quantity and acquired location data of the secondary user terminal to obtain a channel matrix; and calculating a detection metric based on the channel matrix and the sampling data, calculating a decision threshold according to the channel matrix and the sampling quantity, comparing the detection metric and the decision threshold, and if the detection metric is greater than the decision threshold, determining that a channel is occupied by a primary user, or otherwise, determining that a channel is not occupied by a primary user, wherein performing channel estimation based on the sampling quantity and acquired location data of the secondary user terminal comprises:

performing channel estimation after a sampling quantity N is obtained, and generating the channel matrix $$\hat{H} = \begin{bmatrix} \hat{h}_1 & \cdots & \hat{h}_m & 0 & \cdots & \cdots & 0 \\ 0 & \hat{h}_1 & \cdots & \hat{h}_m & 0 & \cdots & 0 \\ & & & \vdots & & & \\ 0 & \cdots & \cdots & 0 & \hat{h}_1 & \cdots & \hat{h}_m \end{bmatrix}_{N \times (N+m-1)},$$

wherein m is a length of a discrete channel, $$\hat{h}_j = \begin{cases} \sum_{i \in I_j} H_{i,LOS}(0), & I_j \neq \varnothing \\ 0, & I_j \neq \varnothing \end{cases}, j = 1, \ldots, m,$$

$$H_{i,LOS}(0) = \begin{cases} \frac{(l+1)A_r \cos^l(\phi_i) T_s(\theta_i) g(\theta_i) \cos(\theta_i)}{2\pi D_i^2}, & 0 \leq \theta_i \leq \psi_c \\ 0, & \theta_i > \psi_c \end{cases}, i = 1, \ldots, L,$$

is a Lambert radiation order of an LED, $A_r$ is an active area of a photoelectric detector module, $T_s$ is a gain of a direct current filter module, g is a gain of an optical concentrator, $\psi_c$ is an angle of view of a receiver of the secondary user terminal, c is the speed of light, $t_0$ is a sampling interval, $I_j = \{i=1, \ldots, L | j = [D_i/ct_0]\}$, [•] is a rounding function, $D_i$ is a distance from an $i^{th}$ LED to the receiver of the secondary user terminal, $\phi_i$ and $\theta_i$ respectively represent an emergence angle and an incident angle, $D_i$, $\phi_i$, and $\theta_i$ are represented as $$\begin{cases} D_i = \sqrt{(x_i - x_r)^2 + (y_i - y_r)^2 + (z_i - z_r)^2} \\ \phi_i = \arccos((z_i - z_r)/D_i) \\ \theta_i = \arccos(\langle v_i, v_o \rangle / (\|v_i\| \cdot \|v_O\|)) \end{cases},$$

wherein $v_i = [x_i - x^r, y_i - y_r, z_i - z_r]$, $v_O = [\sin\beta \cdot \cos\alpha, \sin\beta \cdot \sin\alpha, \cos\beta]$, $\langle \bullet, \bullet \rangle$ represents an inner product of two vectors, and $\alpha$ and $\beta$ are respectively an azimuthal angle and a polar angle of the photoelectric detector module.

5. The multi-source wireless optical communication spectrum sensing method according to claim 4, wherein the coordinates $(x_i, y_i, z_i)$ and $(x_r, y_r, z_r)$ are respectively location coordinates of the $i^{th}$ LED and location coordinates of the receiver of the secondary user terminal, and are acquired by a location information acquisition module.

6. The multi-source wireless optical communication spectrum sensing method according to claim 4, wherein after a sampling data x, a sampling quantity N, and a channel matrix $\hat{H}$ are obtained, a method of calculating the detection metric and the decision threshold comprises:

a calculation formula of the detection metric is $M_{likelihood} = x^T[\sigma_n^{-2}I - (\sigma_n^2 I + \sigma_s^2 \gamma^2 \hat{H}\hat{H}^T)^{-1}]x$, and a calculation formula of the decision threshold is $$K_{likelihood} = \sigma_n^2 \cdot \frac{tr(T^2)}{tr(T)} \cdot F_{\chi^2}^{-1}\left(1 - \mu; \frac{[tr(T)]^2}{tr(T^2)}\right),$$

wherein $T = \sigma_n^{-2}I - (\sigma_n^2 I + \sigma_s^2 \gamma^2 \hat{H}\hat{H}^T)^{-1}$, Tr( ) represents the trace of the matrix, $F_{\chi^2}(x; d)$ is a distribution function of a chi-square distribution with a degree of freedom of d, $\mu$ is a false alarm probability preset by a secondary user, and the false alarm probability is a probability that it is incorrectly determined that a primary user exists when a primary user does not exist.

7. The multi-source wireless optical communication spectrum sensing method according to claim 4, wherein after a sampling data x, a sampling quantity N, and a channel matrix $\hat{H}$ are obtained, a method of calculating the detection metric and the decision threshold comprises:

a calculation formula of the detection metric is $M_{half} = x^T \hat{H}\hat{H}^T x$, and a calculation formula of the decision threshold is $$K_{half} = N^{-1}\sigma_n^2 \frac{\|\hat{H}\hat{H}^T\|_{Fro}^2}{\|\hat{h}\|^2} \cdot F_{\chi^2}^{-1}\left(1 - \mu; \frac{N^2\|\hat{h}\|^4}{\|\hat{H}\hat{H}^T\|_{Fro}^2}\right),$$

wherein $\|\bullet\|_{Fro}$ is the Frobenius norm of the matrix, and $\hat{h} = [\hat{h}_1, \ldots, \hat{h}_m]$.

8. The multi-source wireless optical communication spectrum sensing method according to claim 4, wherein after a sampling data x, a sampling quantity N, and a channel matrix $\hat{H}$ are obtained, a method of calculating the detection metric and the decision threshold comprises:

a calculation formula of the detection metric is $$M_{near} = \frac{(x^T \hat{H} \hat{H}^T x)}{(x^T x)},$$

and the decision threshold $K_{near}$ is obtained by solving an equation $$\mu = 1 - F_F\left(\sum_{i=1}^{N} \omega_i^+ / \sum_{i=1}^{N} \omega_i^-; \left(\sum_{i=1}^{N} \omega_i^+\right)^2 / \sum_{i=1}^{N} (\omega_i^+)^2, \left(\sum_{i=1}^{N} \omega_i^-\right)^2 / \sum_{i=1}^{N} (\omega_i^-)^2\right),$$

wherein $F_F(x; d_1, d_2)$ is a distribution function of an F distribution with parameters being $d_1$ and $d_2$, $\omega_i$ (i=1, ..., N) is an eigenvalue of a matrix $\hat{H}\hat{H}^T - K_{near}I$, and symbols '+' and '−' are respectively defined as $a^+ = \max\{a, 0\}$ and $a^- = \max\{-a, 0\}$.

9. The multi-source wireless optical communication spectrum sensing method according to claim 4, wherein after a sampling data x, a sampling quantity N, and a channel matrix $\hat{H}$ are obtained, a method of calculating the detection metric and the decision threshold comprises:

a calculation formula of the detection metric is $M_{joint} = x^T \hat{H} Q Q^T \hat{H}^T x$, and a calculation formula of the decision threshold is $$K_{joint} = \sigma_n^2 \frac{\|\hat{H} Q Q^T \hat{H}^T\|_{Fro}^2}{\|\hat{H} Q\|_{Fro}^2} \cdot F_{\chi^2}^{-1}\left(1 - \mu; \frac{\|\hat{H} Q\|_{Fro}^4}{\|\hat{H} Q Q^T \hat{H}^T\|_{Fro}^2}\right), \text{ wherein } Q =$$

$$\begin{bmatrix} Q_0 & & \\ & Q_0 & \\ & & \ddots \\ & & & Q_0 \end{bmatrix}, Q_0 = \begin{bmatrix} O_{L_C \times L_D} & I_{L_C \times L_C} \\ I_{L_D \times L_D} & O_{L_D \times L_C} \end{bmatrix},$$

a sample x comprises D OFDM symbols, and sampling quantities of cyclic prefixes and data in each OFDM symbol are respectively $L_c$ and $L_d$.

* * * * *